Feb. 11, 1941.  J. J. LEE  2,231,340
FISHING REEL
Filed May 29, 1940  2 Sheets-Sheet 1
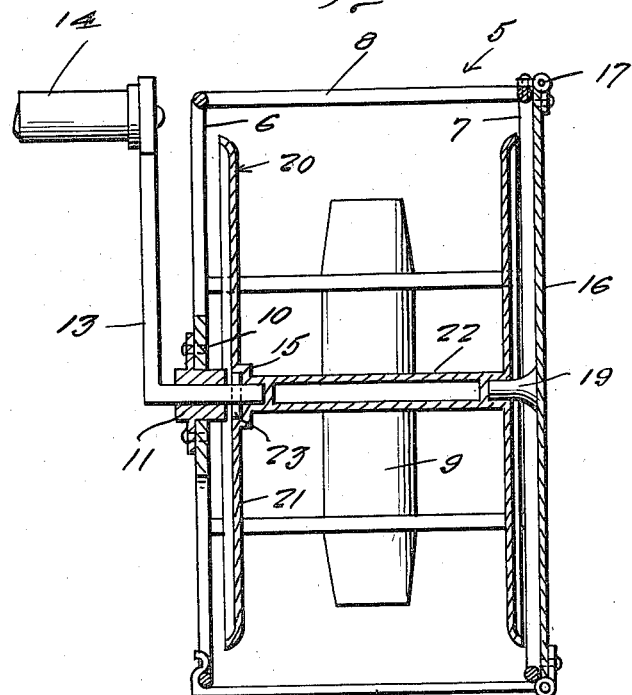
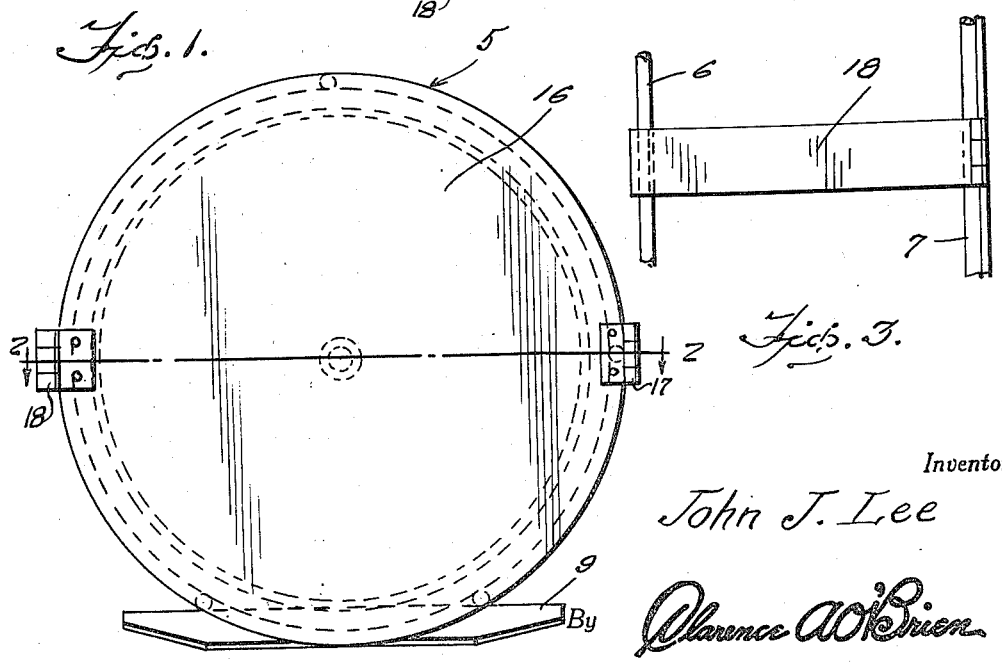
Inventor
John J. Lee
By Clarence A. O'Brien
Attorney.

Feb. 11, 1941.  J. J. LEE  2,231,340
FISHING REEL
Filed May 29, 1940   2 Sheets-Sheet 2
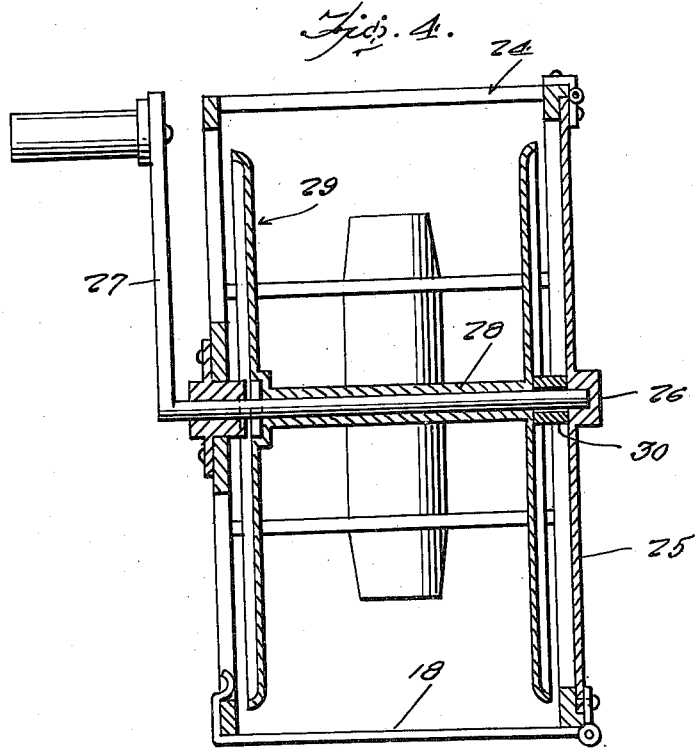
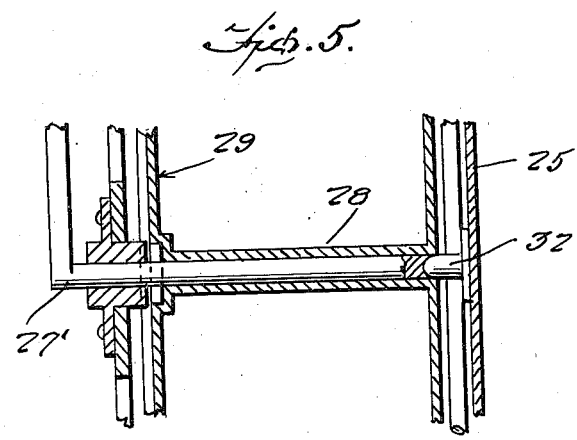
Inventor
John J. Lee
By Clarence A. O'Brien
Attorney Patented Feb. 11, 1941

2,231,340

UNITED STATES PATENT OFFICE 2,231,340

FISHING REEL

John J. Lee, Hartford, Conn.

Application May 29, 1940, Serial No. 337,904

5 Claims. (Cl. 242—84.1)

This invention relates to fishing reels, and has for the primary object the provision of a reel mounting which may be easily installed on a fishing pole and so constructed as to receive and permit removal therefrom reel elements carrying fishing lines whereby a person may easily and quickly change from one fishing line on the pole to another fishing line without the danger of the fishing lines becoming tangled or snarled and permitting the change to be brought about within a very short period of time.

With these and other objects in view as will become more apparent as the description proceeds, the invention consists in certain other novel features of construction, combination and arrangement of parts as will be hereinafter more fully described and claimed.

For a complete understanding of my invention, reference is to be had to the following description and accompanying drawings, in which Figure 1 is a side elevation illustrating a fishing reel constructed in accordance with my invention.

Figure 2 is a vertical sectional view illustrating the same.

Figure 3 is a fragmentary plan view illustrating a latch bar.

Figure 4 is a vertical sectional view illustrating a modified form of my invention.

Figure 5 is a fragmentary sectional view, illustrating another modified form of my invention.

Referring in detail to the drawings, the numeral 5 indicates a mounting frame including opposed spaced annular members 6 and 7 integrally connected with each other by cross members 8, certain ones of which have secured thereto an attaching plate 9 employed for the mounting of the device in the usual manner on a fishing pole.

The annular member 6 has integral therewith a bearing member 10 carrying a bearing 11 to rotatably receive a crank handle 13 provided with a hand grip 14. The crank handle 13 has a portion thereof journaled in the bearing 11 and carrying a pin 15.

A side plate 16 is hinged on the annular member 7 as shown at 17 and secured opposite to the hinge on the side plate is a latch member 18 adapted to engage with the annular member 6 for securing the side plate against the annular member 7. The side plate has formed thereon a pintle 19 coactive with one end of the crank handle 13 in rotatably supporting within the mounting 5 a reel element 20.

The reel element includes spaced opposed annular plates 21 integrally connected by a tubular member 22 in which is received at one end the crank handle 13 and in the other end the pintle 19. The tubular member 22 is offset to form notches 23 to receive the pin 15 for securing the crank handle thereto so that the reel element 20 may be rotated by the crank handle.

It is to be understood that a fishing line (not shown) is to be wound on the tubular member 22 between the plates 21.

When it is desired to remove the reel element 20 from the mounting 5 the latch member 18 is freed from the annular member 6 and the side plate 16 may then be swung on its hinge 17 to free the pintle 19 and the crank handle from the tubular member 22 of the reel element. The reel element may then be moved endwise through the annular member 7 and another reel element of a similar construction carrying another fishing line may then be placed in the mounting 5.

Referring to my modified form of the invention, the mounting is indicated by the character 24 and is similarly constructed to the mounting 5 except that the end plate 25 thereof is offset to form a bearing 26. In this form of my invention the crank handle 27 is made of such a length that it may extend entirely through the tubular element 28 of the reel element 29 and enter the bearing 26. One of the side plates of the reel element carries a spacing collar 30 to space the reel element a proper distance from the side plate 25. To remove the reel element 29 from the mounting 24 the side plate 25 is swung on its hinge by releasing the latch member 18. As the side plate swings away from the mounting 24 the reel element 20 may move therewith off of the crank handle.

Referring to the modified form of my invention, as shown in Figure 5, the end plate 25 may be provided with a pintle 32 in lieu of the bearing 26. The pintle 32 enters the tubular member 28 and a recess provided in the end of the crank handle 27'. In this instance the crank handle is slightly shorter than the one shown in Figure 4.

From the foregoing description taken in connection with the accompanying drawings it will be seen that a very efficient mounting has been provided which may be readily adapted in the usual way to a fishing pole and is of such a construction to coact with specially constructed reel elements so that the reel elements may be placed in and removed from the mounting as desired.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a device of the class described, a mounting including spaced opposed annular members and cross members connecting said annular members, a pole attaching plate secured on certain of said cross members, a reel element insertible in the mounting through one of said annular members and including a tubular member, a bearing carried by one of the annular members, a side plate hinged to the other annular member, a crank handle journaled in said bearing and entering the tubular member, a pintle carried by the side plate and entering the tubular member and cooperating with the crank shaft in rotatably supporting the reel element in the mounting.

2. In a device of the class described, a mounting including spaced opposed annular members and cross members connecting said annular members, a pole attaching plate secured on certain of said cross members, a reel element insertible in the mounting through one of said annular members and including a tubular member, a bearing carried by one of the annular members, a side plate hinged to the other annular member, a crank handle journaled in said bearing and entering the tubular member, a pintle carried by the side plate and entering the tubular member and cooperating with the crank shaft in rotatably supporting the reel element in the mounting, said tubular member having offsets to form notches, a pin carried by the crank handle and fitting in said notches.

3. In a device of the class described, a mounting including spaced opposed annular members and cross members connecting said annular members, a pole attaching plate secured on certain of said cross members, a reel element insertible in the mounting through one of said annular members and including a tubular member, a bearing carried by one of the annular members, a side plate hinged to the other annular member, a crank handle journaled in said bearing and entering the tubular member, a pintle carried by the side plate and entering the tubular member and cooperating with the crank shaft in rotatably supporting the reel element in the mounting, said tubular member having offsets to form notches, a pin carried by the crank handle and fitting in said notches, and a latch member carried by the side plate and engageable with one of the annular members.

4. In a device of the class described, a mounting including spaced opposed annular members, means for integrally connecting said annular members, an attaching plate carried by said means, a bearing member carried by one of the annular members, a bearing supported by said bearing member, a crank handle journaled in said bearing, a reel element insertible in the mounting through one of the annular members and including a tubular member having a portion of the crank handle extending therethrough, means for establishing a driving connection between the reel element and the crank handle, a side plate hinged on the other annular member and having a bearing to receive one end of the crank handle, and a latch means for securing the side plate against hinging movement on the mounting.

5. In a device of the class described, a mounting including spaced opposed annular members, means for connecting the annular members, a reel element insertible in the mounting through one of said annular members, a crank handle journaled on one of the annular members, said reel element including a tubular member through which the crank handle extends, a cover plate hinged on the mounting, fastening means for releasably securing the plate against hinging movement on the mounting, a pintle carried by the plate and entering the tubular member, said crank handle having a recessed end to receive the pintle.

JOHN J. LEE.